United States Patent [19]

Thorn

[11] Patent Number: 4,928,991
[45] Date of Patent: May 29, 1990

[54] ASPIRATING INFLATOR ASSEMBLY

[75] Inventor: William F. Thorn, Redmond, Wash.

[73] Assignee: Automotive Systems Laboratory, Inc., Farmington Hills, Mich.

[21] Appl. No.: 320,396

[22] Filed: Mar. 8, 1989

[51] Int. Cl.⁵ .................. B60R 21/16; B60R 21/26
[52] U.S. Cl. ............................... 280/738; 280/742
[58] Field of Search .............. 280/743, 739, 728, 732, 280/738; 417/167, 185, 161

[56] References Cited

U.S. PATENT DOCUMENTS

| | | | |
|---|---|---|---|
| 2,399,670 | 5/1946 | Freygang | 9/2 |
| 2,595,218 | 5/1952 | Allen | 137/21 |
| 2,866,593 | 12/1958 | Bowman et al. | 230/95 |
| 2,975,958 | 3/1961 | Kane | 230/95 |
| 3,040,970 | 6/1962 | Wismar | 230/103 |
| 3,042,290 | 7/1962 | Fraebel | 230/95 |
| 3,056,540 | 10/1962 | Marsh et al. | 230/95 |
| 3,086,348 | 4/1963 | Reinecke | 23/254 |
| 3,158,314 | 11/1964 | Young et al. | 230/95 |
| 3,204,862 | 9/1965 | Hadeler | 230/95 |
| 3,370,784 | 2/1968 | Day | 230/95 |
| 3,888,505 | 6/1975 | Shibamoto | 280/738 |
| 3,909,037 | 9/1975 | Stewart | 280/738 |
| 3,910,595 | 10/1975 | Katter et al. | 280/738 |
| 3,937,258 | 2/1976 | Loomba | 280/742 |

Primary Examiner—Richard A. Bertsch
Attorney, Agent, or Firm—Lyman R. Lyon

[57] ABSTRACT

An aspirating inflator assembly for a vehicle occupant restraint system comprises a housing having spaced sidewalls, a back wall and an openable front wall. An airbag is stored internally of the housing. Multiple gas generators are supported on or adjacent to the back wall of the housing. The housing has a plurality of apertures in the sidewalls thereof that are normally closed by valves which are openable to aspirate ambient air into the housing but preclude exhaust of air outwardly of the housing.

10 Claims, 2 Drawing Sheets

ASPIRATING INFLATOR ASSEMBLY

BACKGROUND OF THE INVENTION

This invention relates generally to vehicle occupant restraint systems in which an air bag is inflated to prevent the occupant from being thrown forwardly upon the occurance of sudden stoppage of the vehicle and more particularly to an improved aspirating inflator for such restraint systems.

Protective air bags that inflate to cushion the occupant for a vehicle from impact with the steering wheel, dashboard or other structural elements of a vehicle are well known. Deployment of the air bag is generally initiated by a sensor that is responsive to excessive deceleration of the vehicle. The air bag is generally inflated by igniting a combustible material or by releasing a gas and thereafter directing the combustion product or gas directly into the bag.

Automotive passenger restraint systems have evolved using two alternative inflation systems. One system comprises direct inflation wherein all of the gas used to inflate the bag originates in the gas source. The gas source may be pressurized gas, for example, air or nitrogen or a solid propellant.

Alternatively, the gas source may be combined with an aspirator. Current aspirated designs favor the use of a solid propellant, for example, a mixture of sodium azide and one of several oxidizers, in combination with an aspirator. In such aspirated designs, the inflating gas is augmented by air aspirated from the ambient air. Aspirator augmentation is advantageous in that a smaller gas source can be used, the final gas temperature is lower, and inflation is "softer" giving rise to lower impact forces on the vehicle occupant.

Conventional aspirator inflators typically use a solid propellant gas source that is contained within an aspirator housing. Flw of the propellant gas induces ambient air flow through orifices in a rear wall of the aspirator housing. Bulk pumping ratios, namely, the ratio of the weight of secondary gas (air) pumped to the weight of primary gas originating in the gas source, in the final bag gas composition are typically in the range of 0.1 to 0.5 for this type of inflator.

The foregoing construction is taught in U.S. Pat. No. 3,910,595 to Katter et al., which describes an aspirating airbag inflator that utilizes a plurality of gas generating cartridges. The gas generators are mounted on vertical struts in an aspirator duct. Air inlets and check valves are arranged in the rear wall of the duct in several different manners. Other prior art patents that teach the use of aspirating devices to inflate various devices are Freygang, U.S. Pat. No. 2,399,670; Allen, U.S. Pat. No. 2,595,218; Bowman et al., U.S. Pat. No. 2,866,593; Kane, U.S. Pat. No. 2,975,958; Wilmar, U.S. Pat. No. 3,040,970; Fraibel, U.S. Pat. No. 3,042,290; Marsh et al., U.S. Pat. No. 3,056,540 Galiger et al., U.S. Pat. No. 3,086,848; Young et al., U.S. Pat. No. 3,158,314; Hadler, U.S. Pat. No. 3,204,862; and Day, U.S. Pat. No. 3,370,784.

However, a problem still exists in maximizing the efficiency of an aspiration system designed for vehicle occupant protection.

SUMMARY OF THE INVENTION

The advanced aspirating inflator of the present invention consists of a housing having an imperforate rear wall upon or adjacent to which multiple gas generators are mounted to provide the primary gas source. When the gas generators are activated, air is inducted laterally with respect to the direction of flow of gas from the gas generators through inlets and check valves in the sidewalls of the aspirator housing. Lateral aspiration maximizes flow path efficiency, making it possible to use low-cost multiple gas generators that can be programmed so that the system can adapt to the conditions of the crash, i.e., vehicle velocity, ambient temperature, occupant size and or position or other condition.

BRIEF DESCRIPTION OF THE DRAWINGS

As seen in FIG. 1, an inflator assembly 10 contains eight gas generating cartridges 12 that are mounted on or adjacent to a rear wall 14 of an inflator housing 16. An electric ignitor 18 (FIG. 4) is provided for each cartridge 12, the igniters 18 being electrically connected to a power supply 20 and deceleration sensor (not shown) by a printed circuit board 24. The electric igniters 18 may be of the bridgewire type or conductive mix type with the latter type being preferred. Conventional bridgewire squibs, exploding foil initiators, exploding bridgewire initiators, or semiconductor bridge initiators may all be used for this application.

Figure 1:
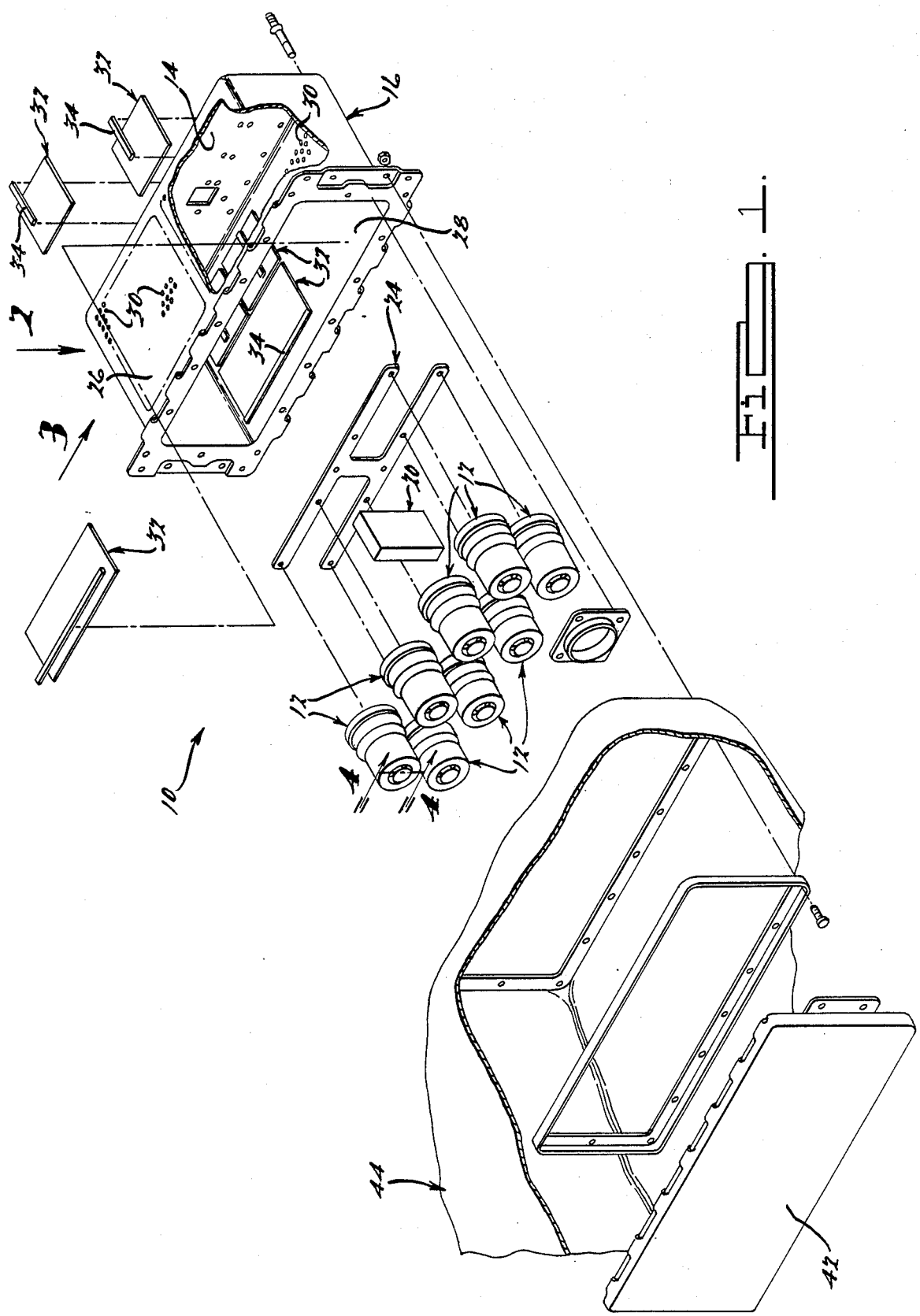
FIG. 1 is a perspective view of an inflator assembly in accordance with the present invention.
Figure 2:
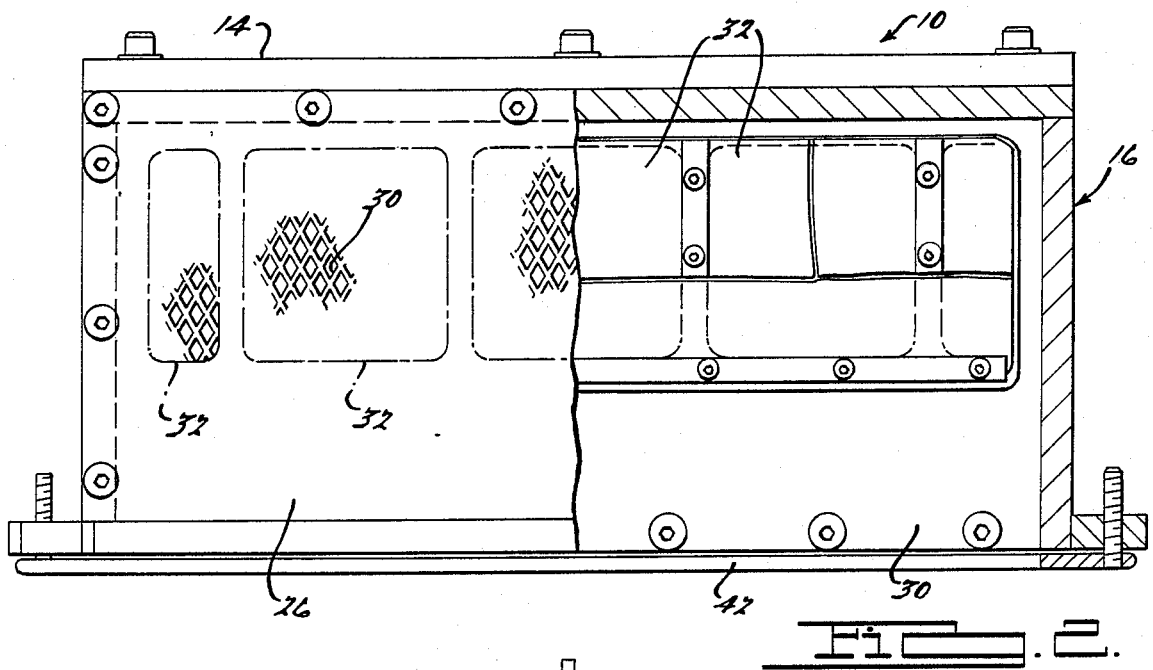
FIG. 2 is a view taken in the direction of the arrow 2 of FIG. 1.

In accordance with the present invention, top and bottom side walls 26 and 28 of the housing 16 are provided with perforations 30 therein which serve as inlets for aspirated air. The perforations 30 are covered on the inside of the housing 16 of flapper-type check valves 32 which open during air induction and close under the influence of reverse flow and/or back pressure. The flapper-type valves 32 are secured to the top and bottom side walls 26 and 28 by retainer strips 34.

Figure 3:
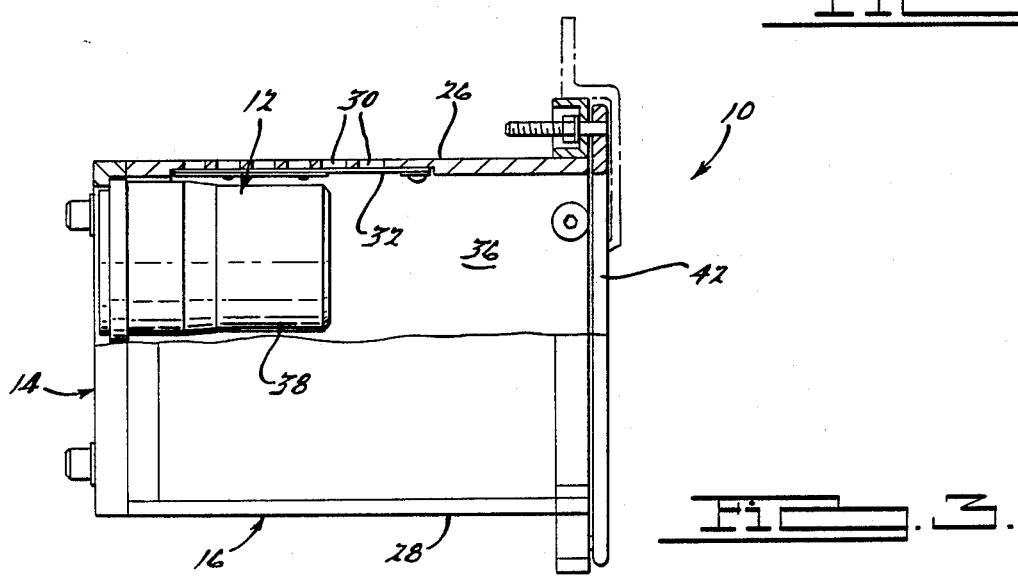
FIG. 3 is a view taken in the direction of the arrow 3 of FIG. 1.
Figure 4:
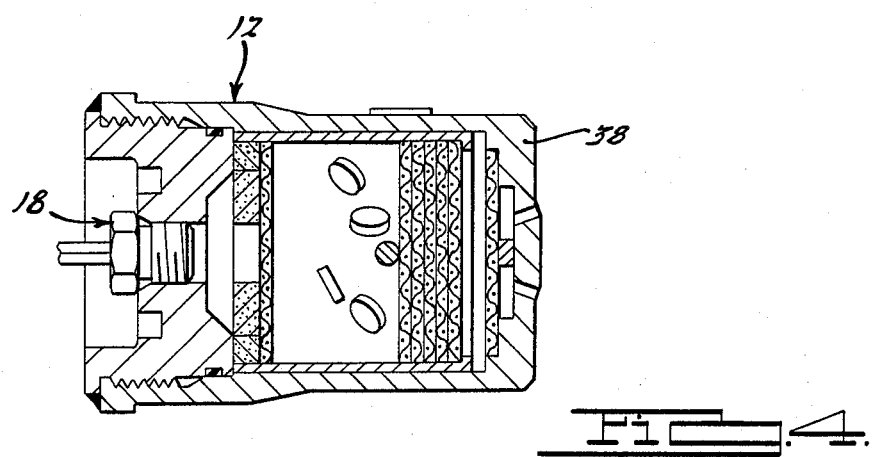
FIG. 4 is a view taken along the line 4—4 of FIG. 1.

A space 36 (FIG. 3) between a nozzle end 38 of each cartridge 12 and a frontal panel 42 on the housing 16 functions as a storage location for an airbag 44, shown deployed in FIG. 1. The panel 42 closes the frontal opening of the housing 16 and contains a tear line that ruptures in a controlled manner when the inflator 10 is activated.

Gas flow from the multiple gas generating cartridges 12 aspirates ambient air through the sidewall air inlets 30 which are sized and configured so as to produce a net open area equal to or greater than the frontal opening of the inflator housing 16. It is to be noted that the air inlet openings 30 are arranged toward the rear or upstream end of the housing 16 so as to provide a short imperforate section of housing wall near the frontal panel 42 thereof that defines an air and gas mixing zone and to avoid exhausting primary gas from the cartridges 12 out the sidewall openings 30.

From the foregoing it should be apparent that the inflator of the present invention utilizes a plurality of gas generator cartridges mounted on or adjacent to the rear wall of an inflator housing. Aspirated air is introduced through apertures and associated flapper-type check valves in the housing sidewalls. This orientation of elements results in observed improvement in pumping ratio performance over aspirating inflators heretofore known and used. Typically achievable pumping ratios using the present invention are in the range of 1.0 to 1.5.

While the preferred embodiment of the invention has been disclosed, it should be appreciated that the invention is susceptible of modification without departing from the scope of the following claims.

I claim:

1. An aspirating inflator assembly for a vehicle occupant restraint system comprising,
    a housing defined by spaced sidewalls, a back wall and an openable front panel,
    an airbag attached to and stored internally of said housing,
    a plurality of gas generators supported adjacent to the back wall of said housing,
    a plurality of apertures in at least one sidewall of said housing, and
    a valve on said housing for admitting ambient air thereinto through said apertures but precluding exhaust of air outwardly of said housing, the frontal panel on said housing being openable upon energization of said gas generator to facilitate deployment of said airbag.

2. An inflator assembly in accordance with claim 1 wherein said airbag is stored adjacent said front panel.

3. An inflator assembly in accordance with claim 1 wherein said apertures are disposed adjacent the back wall of said housing.

4. An inflator assembly in accordance with claim 1 wherein said cartridges are cantilevered from the back wall of said housing.

5. An inflator assembly in accordance with claim 1 wherein the sidewalls of said housing are imperforate adjacent the front wall thereof.

6. An inflator assembly in accordance with claim 1 wherein each gas generator assembly is equipped with an individual electric igniter.

7. An inflator assembly in accordance with claim 6 wherein said igniters are electrically connected in a common electrical circuit.

8. An inflator assembly in accordance with claim 7 wherein the common circuit for said gas generators comprises a printed circuit board.

9. An inflator assembly in accordance with claim 1 wherein said valve comprises a flapper-type valve.

10. An inflator assembly in accordance with claim 9 wherein said flapper valve is hinged at a frontal extremity thereof to enhance closing upon the occurrence of an air flow reversal.

* * * * *